US012771944B2

(12) United States Patent
Kurota et al.

(10) Patent No.: US 12,771,944 B2
(45) Date of Patent: Oct. 20, 2026

(54) APPARATUS, SYSTEM AND METHOD OF INFORMATION PROCESSING, AND STORAGE MEDIUM

(71) Applicant: CANON KABUSHIKI KAISHA, Tokyo (JP)

(72) Inventors: Masaru Kurota, Tokyo (JP); Takuya Iwata, Tokyo (JP); Tomoaki Komiyama, Kanagawa (JP); Akira Kosuge, Tokyo (JP); Takashi Mori, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/988,466

(22) Filed: Dec. 19, 2024

(65) Prior Publication Data

US 2025/0211860 A1 Jun. 26, 2025

(30) Foreign Application Priority Data

Dec. 26, 2023 (JP) ................................ 2023-220111

(51) Int. Cl.

| | |
|---|---|
| ***H04N 23/695*** | (2023.01) |
| ***H04N 23/56*** | (2023.01) |
| ***H04N 23/61*** | (2023.01) |
| ***H04N 23/62*** | (2023.01) |
| ***H04N 23/69*** | (2023.01) |

(52) U.S. Cl.

CPC ........... *H04N 23/695* (2023.01); *H04N 23/56* (2023.01); *H04N 23/61* (2023.01); *H04N 23/62* (2023.01); *H04N 23/69* (2023.01)

(58) Field of Classification Search

CPC ...... H04N 23/695; H04N 23/56; H04N 23/61; H04N 23/62; H04N 23/69; G06T 7/246; G06T 7/73; G06T 2207/30242; G06V 40/10; G08B 5/22

See application file for complete search history.

(56) References Cited

U.S. PATENT DOCUMENTS 11,176,691 B2 11/2021 Ghadyali
11,750,913 B2 9/2023 Mizuma
(Continued)

FOREIGN PATENT DOCUMENTS

CN 106161953 A 11/2016
JP H04126473 A 4/1992
(Continued)

*Primary Examiner* — Shadan E Haghani

(74) *Attorney, Agent, or Firm* — Canon U.S.A., Inc. IP Division

(57) ABSTRACT

An information processing apparatus includes a detection unit configured to detect a plurality of subjects from an image, a selection unit configured to select a subject as a tracking target, a tracking unit configured to track the subject as the tracking target selected by the selection unit using information about the plurality of subjects detected by the detection unit, a counting unit configured to count the number of subjects currently being tracked by the tracking unit, and a notification unit configured to notify a tracking state by the tracking unit. The notification unit notifies the tracking state according to the number of subjects selected by the selection unit and the number of subjects counted by the counting unit.

26 Claims, 19 Drawing Sheets

(56) References Cited

U.S. PATENT DOCUMENTS

| | | | | |
|---|---|---|---|---|
| 12,488,595 | B2 * | 12/2025 | Parikh | G06V 20/58 |
| 2010/0123782 | A1 | 5/2010 | Yata | |
| 2011/0019027 | A1 * | 1/2011 | Fujita | H04N 23/611<br>348/222.1 |
| 2011/0019066 | A1 | 1/2011 | Takano | |
| 2016/0008695 | A1 * | 1/2016 | Aman | A63B 71/0669<br>348/157 |
| 2016/0140391 | A1 * | 5/2016 | Kim | G06T 7/20<br>382/103 |
| 2019/0082088 | A1 | 3/2019 | Zhao | |
| 2023/0056334 | A1 * | 2/2023 | Liu | G06V 10/62 |
| 2024/0037759 | A1 * | 2/2024 | Feng | G06T 7/246 |
| 2025/0392778 | A1 * | 12/2025 | Kerofsky | H04N 21/4316 |

FOREIGN PATENT DOCUMENTS

| | | | |
|---|---|---|---|
| JP | 2007049229 | A | 2/2007 |
| JP | 2009212637 | A | 9/2009 |
| JP | 2009218719 | A | 9/2009 |
| JP | 2010087676 | A | 4/2010 |
| JP | 2010183253 | A | 8/2010 |
| JP | 2013162425 | A | 8/2013 |
| JP | 5848507 | B2 | 1/2016 |
| JP | 2018157263 | A | 10/2018 |
| JP | 2023127983 | A | 9/2023 |

* cited by examiner

FIG.6A

| ID | POSITIONAL INFORMATION | TRACKING TARGET |
|---|---|---|
| 1 | $(x_1, y_1)$ $(w_1, h_1)$ $(gx_1, gy_1)$ | × |
| 2 | $(x_2, y_2)$ $(w_2, h_2)$ $(gx_2, gy_2)$ | × |
| 3 | $(x_3, y_3)$ $(w_3, h_3)$ $(gx_3, gy_3)$ | × |

FIG.6B

| ID | POSITIONAL INFORMATION | TRACKING TARGET |
|---|---|---|
| 1 | $(x_1, y_1)$ $(w_1, h_1)$ $(gx_1, gy_1)$ | ○ |
| 2 | $(x_2, y_2)$ $(w_2, h_2)$ $(gx_2, gy_2)$ | × |
| 3 | $(x_3, y_3)$ $(w_3, h_3)$ $(gx_3, gy_3)$ | × |

FIG.6C

| ID | POSITIONAL INFORMATION | TRACKING TARGET |
|---|---|---|
| 1 | — | ○ |
| 2 | — | × |
| 3 | $(x_4, y_4)$ $(w_4, h_4)$ $(gx_4, gy_4)$ | × |

FIG.9A

| ID | POSITIONAL INFORMATION | TRACKING TARGET |
|---|---|---|
| 1 | $(x_1, y_1)$ $(w_1, h_1)$ $(gx_1, gy_1)$ | ○ |
| 2 | $(x_2, y_2)$ $(w_2, h_2)$ $(gx_2, gy_2)$ | ○ |
| 3 | $(x_3, y_3)$ $(w_3, h_3)$ $(gx_3, gy_3)$ | ○ |

FIG.9B

| ID | POSITIONAL INFORMATION | TRACKING TARGET |
|---|---|---|
| 1 | $(x_4, y_4)$ $(w_4, h_4)$ $(gx_4, gy_4)$ | ○ |
| 2 | $(x_5, y_5)$ $(w_5, h_5)$ $(gx_5, gy_5)$ | ○ |
| 3 | — | ○ |

FIG.9C

| ID | POSITIONAL INFORMATION | TRACKING TARGET |
|---|---|---|
| 1 | — | ○ |
| 2 | — | ○ |
| 3 | — | ○ |
| 4 | $(x_6, y_6)$ $(w_6, h_6)$ $(gx_6, gy_6)$ | × |

FIG.12A

| ID | POSITIONAL INFORMATION | TRACKING TARGET | TARGET |
|---|---|---|---|
| 1 | $(x_1, y_1)$ $(w_1, h_1)$ $(gx_1, gy_1)$ | ○ | A |
| 2 | $(x_2, y_2)$ $(w_2, h_2)$ $(gx_2, gy_2)$ | ○ | B |
| 3 | $(x_3, y_3)$ $(w_3, h_3)$ $(gx_3, gy_3)$ | ○ | C |

FIG.12B

| ID | POSITIONAL INFORMATION | TRACKING TARGET | TARGET |
|---|---|---|---|
| 1 | $(x_1, y_1)$ $(w_1, h_1)$ $(gx_1, gy_1)$ | ○ | A |
| 2 | $(x_2, y_2)$ $(w_2, h_2)$ $(gx_2, gy_2)$ | ○ | B |
| 3 | — | ○ | C |

FIG.12C

| ID | POSITIONAL INFORMATION | TRACKING TARGET | TARGET |
|---|---|---|---|
| 1 | — | ○ | A |
| 2 | — | ○ | B |
| 3 | — | ○ | C |
| 4 | $(x_4, y_4)$ $(w_4, h_4)$ $(gx_4, gy_4)$ | × | D |
| 5 | $(x_5, y_5)$ $(w_5, h_5)$ $(gx_5, gy_5)$ | × | — |

FIG.14A

| ID | POSITIONAL INFORMATION | TRACKING TARGET | TARGET | TYPE |
|---|---|---|---|---|
| 1 | $(x_1, y_1)$ $(w_1, h_1)$ $(gx_1, gy_1)$ | ○ | A | MAIN |
| 2 | $(x_2, y_2)$ $(w_2, h_2)$ $(gx_2, gy_2)$ | ○ | D | SUB |
| 3 | $(x_3, y_3)$ $(w_3, h_3)$ $(gx_3, gy_3)$ | ○ | E | SUB |

FIG.14B

| ID | POSITIONAL INFORMATION | TRACKING TARGET | TARGET | TYPE |
|---|---|---|---|---|
| 1 | — | ○ | A | MAIN |
| 2 | $(x_2, y_2)$ $(w_2, h_2)$ $(gx_2, gy_2)$ | ○ | D | SUB |
| 3 | $(x_3, y_3)$ $(w_3, h_3)$ $(gx_3, gy_3)$ | ○ | E | SUB |

FIG.14C

| ID | POSITIONAL INFORMATION | TRACKING TARGET | TARGET | TYPE |
|---|---|---|---|---|
| 1 | $(x_1, y_1)$ $(w_1, h_1)$ $(gx_1, gy_1)$ | ○ | A | MAIN |
| 2 | $(x_2, y_2)$ $(w_2, h_2)$ $(gx_2, gy_2)$ | ○ | D | SUB |
| 3 | — | ○ | E | SUB |

FIG.14D

| ID | POSITIONAL INFORMATION | TRACKING TARGET | TARGET | TYPE |
|---|---|---|---|---|
| 1 | — | ○ | A | MAIN |
| 2 | — | ○ | D | SUB |
| 3 | $(x_3, y_3)$ $(w_3, h_3)$ $(gx_3, gy_3)$ | ○ | E | SUB |

FIG.15

| STATE | PATTERN |
| --- | --- |
| STOPPED | OFF |
| TRACKING | ON |
| LOST/MAIN SUBJECT LOST/ MAIN AND SUB SUBJECTS LOST | BLINKING (AT INTERVALS OF 0.5 SEC.) |
| PARTIALLY LOST/SUB LOST | BLINKING (AT INTERVALS OF 1 SEC.) |

APPARATUS, SYSTEM AND METHOD OF INFORMATION PROCESSING, AND STORAGE MEDIUM

BACKGROUND OF THE INVENTION

Field of the Invention

The present invention relates to an apparatus, a system and a method of information processing, and a storage medium.

Description of the Related Art

In video image production, an automatic tracking control technique automatically performs pan, tilt, and zoom (PTZ) control for an imaging apparatus to place a specific subject at a desired position within the imaging angle of view.

Japanese Patent Application Laid-Open Publication No. 2009-218719 discusses a technique for showing the moving direction and moving speed of a tracking subject, and if a behavior likely to depart from the angle of view is detected, displaying a warning.

However, Japanese Patent Application Laid-Open Publication No. 2009-218719 does not disclose control for tracking a plurality of subjects at the same time.

SUMMARY OF THE INVENTION

According to an aspect of the present invention, an information processing apparatus includes a detection unit configured to detect a plurality of subjects from an image, a selection unit configured to select a subject as a tracking target, a tracking unit configured to track the subject as the tracking target selected by the selection unit using information about the plurality of subjects detected by the detection unit, a counting unit configured to count the number of subjects currently being tracked by the tracking unit, and a notification unit configured to notify a tracking state by the tracking unit. The notification unit notifies the tracking state according to the number of subjects selected by the selection unit and the number of subjects counted by the counting unit.

Further features of the present invention will become apparent from the following description of embodiments with reference to the attached drawings.

BRIEF DESCRIPTION OF THE DRAWINGS

FIGS. 6A to 6C illustrate examples of subject information in a basic operation.

FIGS. 9A to 9C illustrate examples of subject information according to the first embodiment.

FIGS. 12A to 12C illustrate examples of subject information according to the second embodiment.

FIGS. 14A to 14D illustrate examples of subject information in consideration of priority according to the second embodiment.

FIG. 15 illustrates examples of lamp display patterns according to a third embodiment.

DESCRIPTION OF THE EMBODIMENTS

Figure 1:
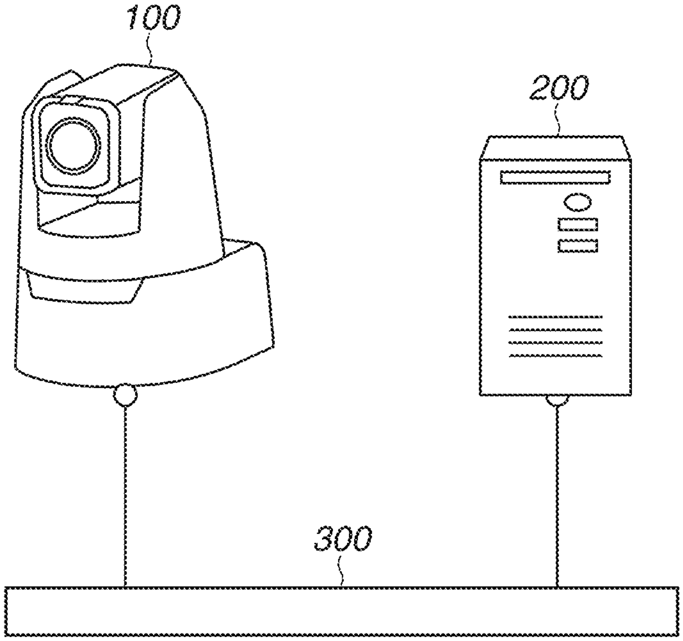
FIG. 1 illustrates an example configuration of a system.

Embodiments of the present invention will be described in detail with reference to the accompanying drawings. The following embodiments do not limit the present invention within the scope of the appended claims. While a plurality of features is described in the embodiments, not all of the plurality of features is used in the present invention, and any combination of the plurality of features can be used. In the accompanying drawings, identical or similar components are assigned the same reference numerals, and duplicated descriptions thereof will be omitted.

System Configuration

FIG. 1 illustrates an example configuration of an information processing system for performing processing according to a first embodiment. Referring to FIG. 1, the information processing system includes a pan, tilt, and zoom (PTZ) camera 100 and a personal computer (PC) 200 as information processing apparatuses. The PTZ camera 100 and the PC 200 are connected to a network formed on a local area network (LAN) 300, to form a network on which the apparatuses can communicate with each other via a communication protocol regardless of wired or wireless.

The PTZ camera 100 is an imaging apparatus capable of capturing images of tracking targets (subjects) and areas around subjects, and outputting captured images to the PC 200 and an external device. The PTZ camera 100 according to the present embodiment includes a drive unit 109 (described below) provided with a mechanism for performing pan and tilt operations to change the imaging direction. The PTZ camera 100 also includes an inference unit 111 (described below) for inferencing positions of subjects on captured images.

The PC 200 accesses the PTZ camera 100 via the LAN 300 to acquire images output by the PTZ camera 100, perform imaging controls based on the user's operations, and set various imaging conditions. Images according to the present embodiment include moving and still images, and the present embodiment is applicable to both types of images.

Figure 2:
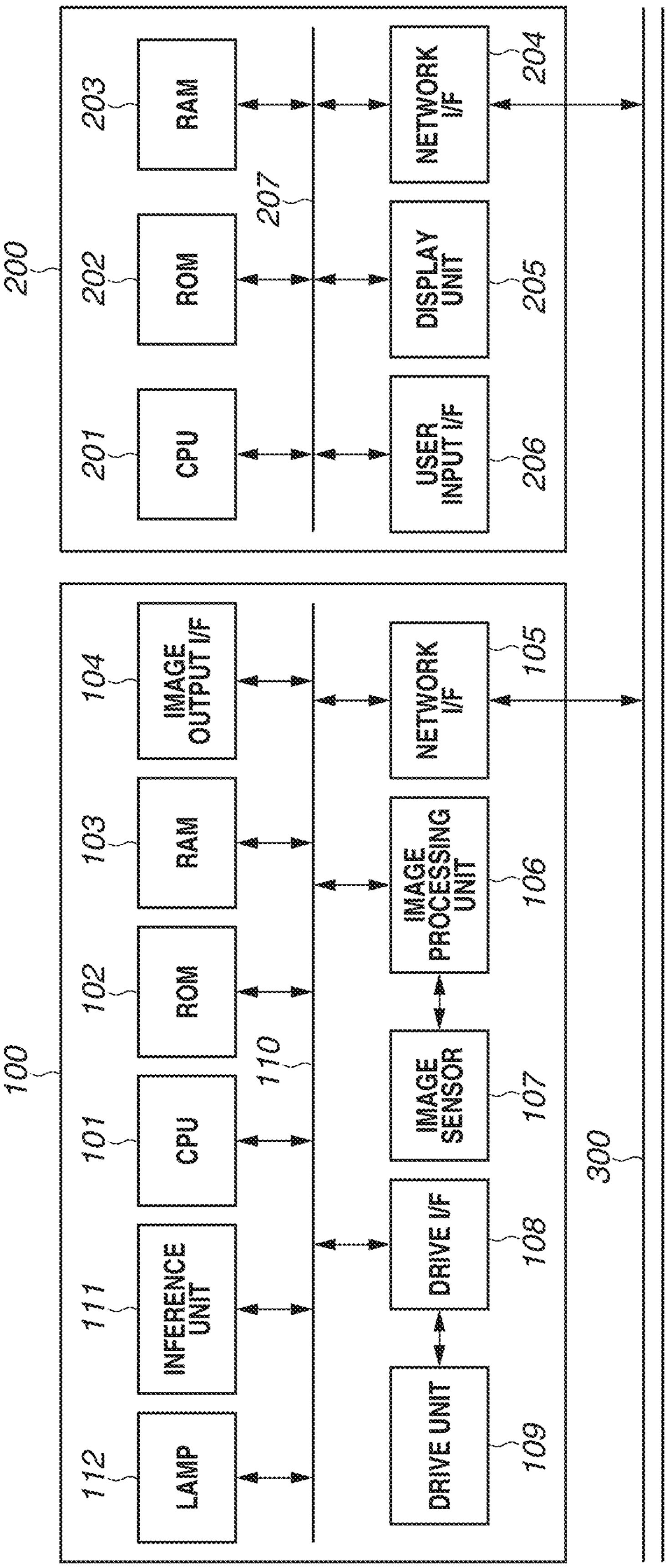
FIG. 2 illustrates examples of hardware configurations of apparatuses included in the system.

FIG. 2 illustrates configurations of the PTZ camera 100 and the PC 200 included in a system. The configuration of each apparatus will be described.

The PTZ camera 100 according to the present embodiment includes a central processing unit (CPU) 101, a read only memory (ROM) 102, a random access memory (RAM)

103, an image output interface (I/F) 104, and a network I/F 105. The PTZ camera 100 further includes an image processing unit 106, an image sensor 107, a drive I/F 108, a drive unit 109, the inference unit 111, and an internal bus 110 for communicably connecting the above-described components.

The CPU 101 generally controls the apparatus by controlling different components of the PTZ camera 100.

The ROM 102 is a nonvolatile storage device represented by a flash memory, a hard disk drive (HDD), a solid state drive (SSD), and a secure digital (SD) card. The ROM 102 is used as a permanent storage area for storing an operating system (OS), various programs, and various types of data, and also used as a temporary storage area for storing various types of data.

The RAM 103 is a volatile high-speed storage device represented by a dynamic random access memory (DRAM) into which an OS, various programs, and various types of data are loaded. The RAM 103 is also used as a work area of the OS and various programs.

The image output I/F 104, an interface for outputting images captured by the image sensor 107 (described below) to an external device, includes a serial digital interface (SDI) and a high-definition multimedia interface (HDMI®).

The network I/F 105, an interface for connecting with the LAN 300, communicates with an external device, such as the PC 200 via a communication medium such as Ethernet®.

The image processing unit 106 connected to the image sensor 107 performs various types of image processing (e.g., defect correction, noise reduction (NR) processing, and color conversion processing) on image data acquired from the image sensor 107 based on instructions from the CPU 101, performs image data conversions into predetermined formats, and performs compression processing. The processed image data is stored in the RAM 103.

The image sensor 107 including a charge coupled device (CCD) sensor or a complementary metal oxide semiconductor (CMOS) sensor functions as an imaging unit in the PTZ camera 100. The image sensor 107 photoelectrically converts subject images formed by a non-illustrated imaging optical system to generate image data.

While, according to the present embodiment, image data is output to the image processing unit 106 as digital signals by an analog-to-digital (A/D) conversion circuit included in the image sensor 107, the image data can be output as analog signals. The image sensor 107 and the image processing unit 106 can be integrated in a stacked chip configuration. While, according to the present embodiment, the imaging optical system for the image sensor 107 to receives subject images through is also integrated, the imaging optical system can be configured to be attachable to, detachable from, and interchangeable for the image sensor 107. According to the present embodiment, the imaging optical system and the image sensor 107 are collectively referred to as an imaging unit in some cases.

The drive I/F 108 is an interface for transmitting instructions received from the CPU 101 to the drive unit 109.

The drive unit 109 is a mechanism and an optical system for changing the imaging direction of the PTZ camera 100. According to the present embodiment, the drive unit 109 changes the imaging direction by rotatably driving the image sensor 107.

The drive unit 109 consists of a mechanical drive system and motors as driving sources. The drive unit 109 performs rotational drive, such as pan and tilt operations to change the imaging direction with respect to the horizontal and vertical directions based on instructions received from the CPU 101 via the drive I/F 108. With an imaging optical system provided with a magnification lens (also referred to as a zoom lens), the drive unit 109 can perform a zoom control to optically change the imaging angle of view by moving the zoom lens in the optical axis direction.

The inference unit 111 performs inference processing using a learned inference model and inference parameters according to an inference program. The inference processing of the inference unit 111 can be performed by a calculation processing apparatus specialized in image processing and inference processing of a graphics processing unit (GPU). The GPU is a processor capable of performing a large number of sum-of-product calculations, and has the ability to perform a neural network matrix calculation in a short time. The inference processing of the inference unit 111 can be performed by a reconfigurable logic circuit, such as a Field-Programmable Gate Array (FPGA). The inference unit 111 can perform the inference processing in collaboration with the CPU 101.

A lamp 112, also referred to as a tally lamp, is a light source, such as a light emitting diode (LED), indicating the control under which the PTZ camera 100 is currently being subjected. The CPU 101 receives instructions from the outside via the network I/F 105 to change the display pattern. The CPU 101 performs status display by color or periodical blink, for example, red indicates that a video image is used for broadcasting and recording, and green indicates a preview state.

The PC 200 according to the present embodiment includes a CPU 201, a ROM 202, a RAM 203, a network I/F 204, a display unit 205, a user input I/F 206, and an internal bus 207 for communicably connecting these components.

The CPU 201 controls components of the PC 200 to generally control the apparatus.

The ROM 202 is a nonvolatile storage device represented by a flash memory, an HDD, an SSD, and an SD card. The ROM 202 is used as a permanent storage device for storing an OS, various programs, and various types of data, and also used as a temporary storage area for storing various types of data.

The RAM 203 is a volatile high-speed storage device represented by a DRAM into which an OS, various programs, and various types of data are loaded. The RAM 103 is also used as a work area of the OS and various programs.

The network I/F 204, an interface for connecting with the LAN 300, communicates with an imaging apparatus, such as the PTZ camera 100 and an external device, such as a server via a communication medium, such as Ethernet.

The display unit 205 displays images acquired from the PTZ camera 100 and setting screens of the PC 200. For example, the display unit 205 is a liquid crystal panel or an organic electroluminescence (EL) panel. While the PC 200 includes the display unit 205 as an example, the PC 200 and the display unit 205 can be configured as different components, such as a display monitor for displaying only captured images and the PC 200 are provided as different components.

The user input I/F 206 includes input devices (operation units), such as a keyboard, a pointing device (mouse), a touch panel, and switches, and receives instructions from the user to the PC 200. The keyboard can be a software keyboard. The CPU 201 monitors the user input I/F 206 and, on a detection of the user's operation on the user input I/F 206, performs processing in response to the detected operation.

Descriptions of Basic Operations in Automatic Tracking Control and Subject Selection Basic controls performed by the system will be described. The basic controls include the automatic tracking control for controlling the PTZ camera 100 to track subjects, and the subject selection for selecting tracking target subjects for the PTZ camera 100 based on the user's operations received by the PC 200.

The automatic tracking control will be described with reference to FIGS. 3 to 6.

Figure 3:
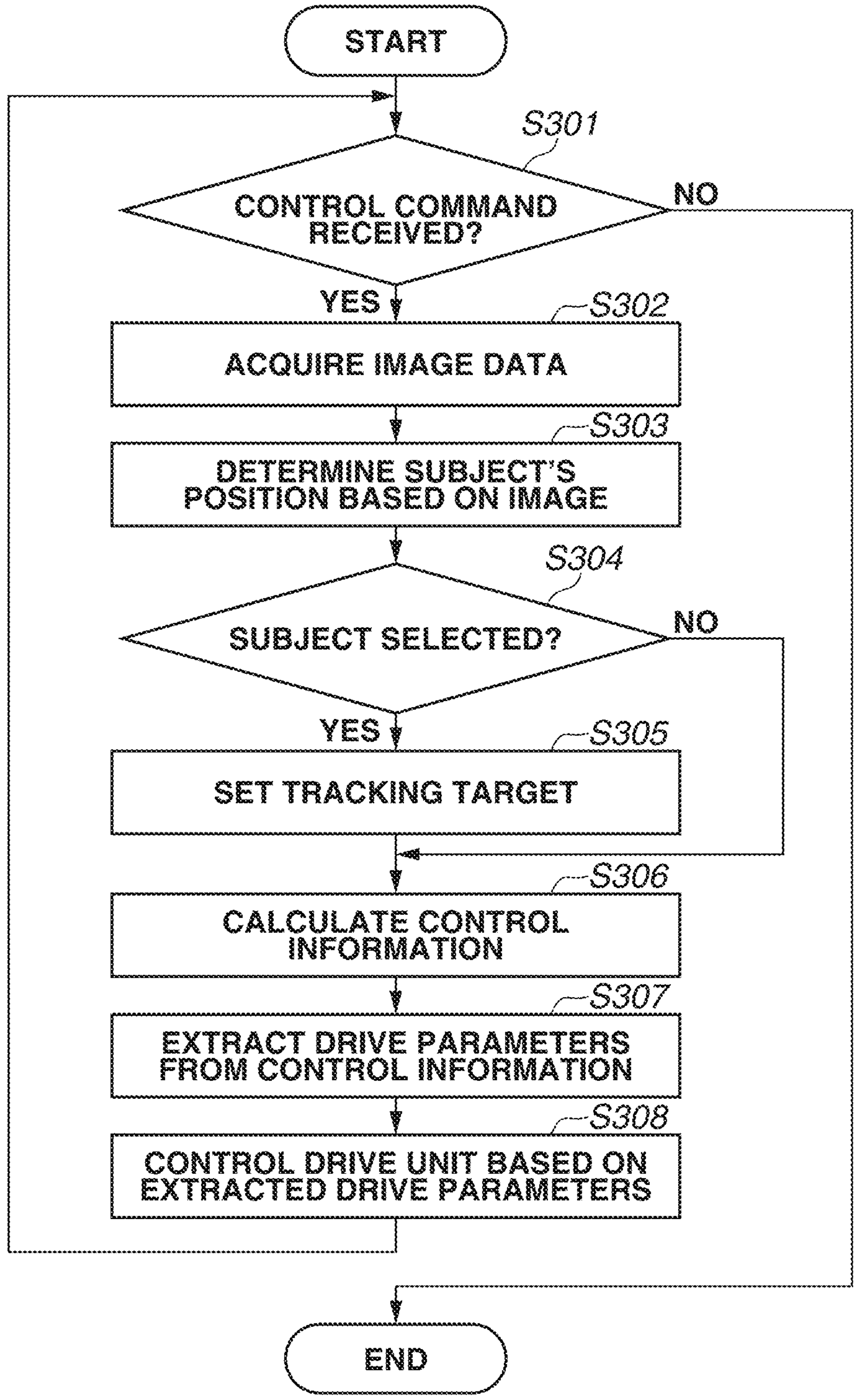
FIG. 3 is a flowchart illustrating an example of a basic operation of an imaging apparatus.

FIG. 3 illustrates a control flow for the PTZ camera 100, more specifically, a series of processing for controlling the PTZ camera 100 according to subject positions detected from captured images.

This control flow is started when the CPU 101 of the PTZ camera 100 receives a control command for performing the automatic tracking control via the network I/F 105.

In step S301, the CPU 101 determines which is received via the network I/F 105, a control command or an end command, and stores the received control command in the RAM 103. If the CPU 101 determines that a control command is received (YES as the result of checking the operation state in step S301), the CPU 101 stores the received control command in the RAM 103. Then, the processing proceeds to step S302. If the CPU 101 determines that an end command is received (NO as the result of checking the operation state in step S301), the CPU 101 completes this control.

In step S302, the CPU 101 acquires the image data stored by the image processing unit 106 from the RAM 103.

In step S303, the CPU 101 determines information about features and positions of subjects in each frame of the captured image data and stores the information in the RAM 103. More specifically, the CPU 101 inputs the image data acquired from the RAM 103 to the inference unit 111. Then, the CPU 101 stores the features of the subjects inferenced by the inference unit 111 and the positional information on the images of the subjects in the RAM 103. The inference unit 111 includes a learned model created using a machine learning technique, such as deep learning, and receives images as input data and outputs identifiers (ID) for identification and positional information as subject information. The positional information will be described as information about the upper left point, the width and height, and the coordinates of the center of gravity of a rectangle that circumscribes a subject on the image. However, the present invention is not limited thereto.

Figure 5A:
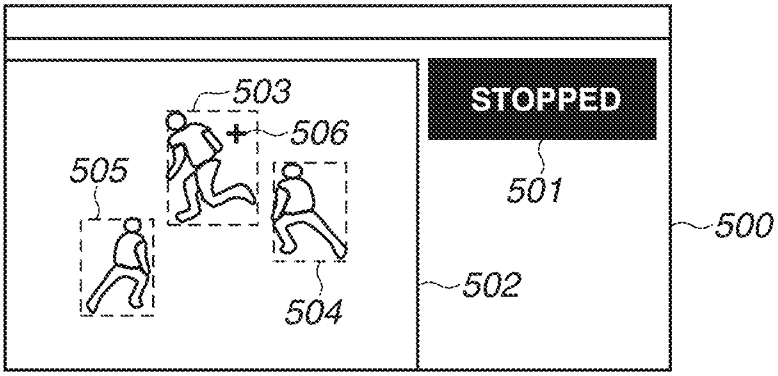
FIGS. 5A to 5C illustrate examples of information display in a basic operation.
Figure 5B:
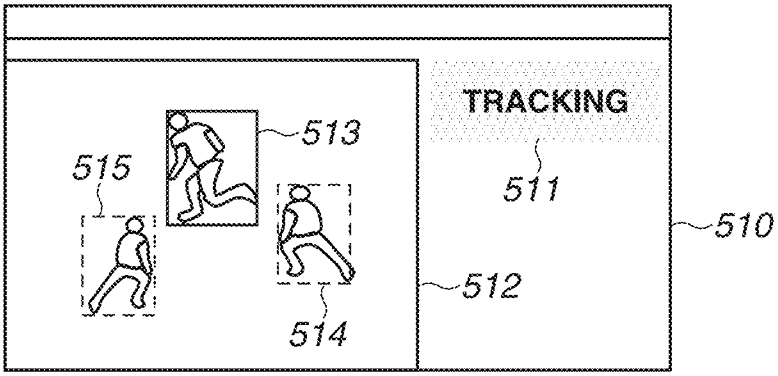

A table illustrated in FIG. 6A shows detected subject information. FIG. 5A illustrates information displayed in a screen of the display unit 205 in the operation of the PC 200 (described below) as an example where there are three different subjects in the angle of view. In FIG. 5A, positional information about subjects output in step S303 is superimposed as subject frames 503 to 505. The subject frame 503 corresponds to ID=1 in FIG. 6A. ($x_{-1}$, $y_1$) indicates the upper left point of the subject frame 503, ($w_1$, $h_1$) indicates the size of the subject frame 503, and ($gx_1$, $gy_1$) indicates the coordinates of the center of gravity. When a subject frame is displayed on the PC 200, the coordinates on the PTZ camera 100 are converted into the coordinate system on the display by the CPU 201. In the present embodiment, the positional information about a subject is determined via the inference unit 111, the present invention is not limited thereto as long as the positional information about the subject can be determined. For example, the CPU 101 can acquire positional information from a wireless communication terminal held by a subject, and use the positional information as the positional information about the subject. The CPU 101 stores the output subject information in the RAM 103. Then, the processing proceeds to step S304.

In step S304, the CPU 101 determines whether subject selection information is received as a control command from the PC 200 via the network I/F 105. If received (YES in step S304), the CPU 101 stores the subject selection information received from the PC 200 in the RAM 103. The present embodiment will be described below on the premise that the subject selection information refers to coordinates (region) in the angle of view. With any subject selected, the processing constantly proceeds to step S305 regardless of the subject selection information.

In step S305, the CPU 101 reads the subject information output in step S303 and the subject selection information received in step S304 from the RAM 103. The CPU 101 compares the positional information in the subject information with the coordinate information included in the subject selection information to check whether the coordinate information is included in the positional information about the subject. A specific example will be described with reference to FIGS. 5A to 5C. If the coordinates specified as the subject selection information indicate a point 506 illustrated in FIG. 5A, the point 506 is included in the region represented by the positional information displayed as the subject frame 503, i.e., the upper left point and a frame. Thus, the CPU 101 determines the subject corresponding to the subject frame 503 to be selected. As illustrated in FIG. 6B, the CPU 101 stores the subject information provided with information indicating whether the subject is a tracking target in the RAM 103, and transmits the subject information to the PC 200. Then, the processing proceeds to step S306.

In step S306, the CPU 101 calculates control positional information (control information) in the automatic tracking control, and stores the control positional information in the RAM 103. The control positional information refers to information (imaging parameters), such as a pan angle, a tilt angle, and a zoom angle of view used to control (move) the image sensor 107 to any desired point. The CPU 101 calculates the pan angle, the tilt angle, the zoom angle of view, and the angular speed when the coordinates of the center of gravity of the tracking target subject selected in step S305 are moved to the center position of the angle of view, and stores the calculation result in the RAM 103 as the control positional information. A state where no subject is selected is equivalent to a state where the control positional information is absent, in which the angle of view is not controlled. When the control positional information is received as a control command from the outside in step S301, the CPU 101 stores the information in the RAM 103 giving priority to the control command, enabling position control from the outside.

In step S307, the CPU 101 reads the control positional information stored in the RAM 103. Based on the control positional information, the CPU 101 extracts drive parameters (control details) for the drive unit 109 to enable pan, tilt, and zoom controls at desired speeds in desired directions. More specifically, the drive parameters are used to control the motors included in the drive unit 109. Amounts of operations based on the control positional information can be converted into drive parameters with reference to a conversion table prestored in the RAM 103.

In step S308, the CPU 101 controls the drive unit 109 via the drive I/F 108 based on the extracted drive parameters, and the drive unit 109 performs rotation operations based on the drive parameters for the PTZ camera 100 to perform the pan, tilt, and zoom operations. This control flow for calculation based on the subject selection information received in step S304 enables the PTZ camera 100 to perform an operation according to the user's subject selection successively transmitted from the PC 200.

Figure 4:
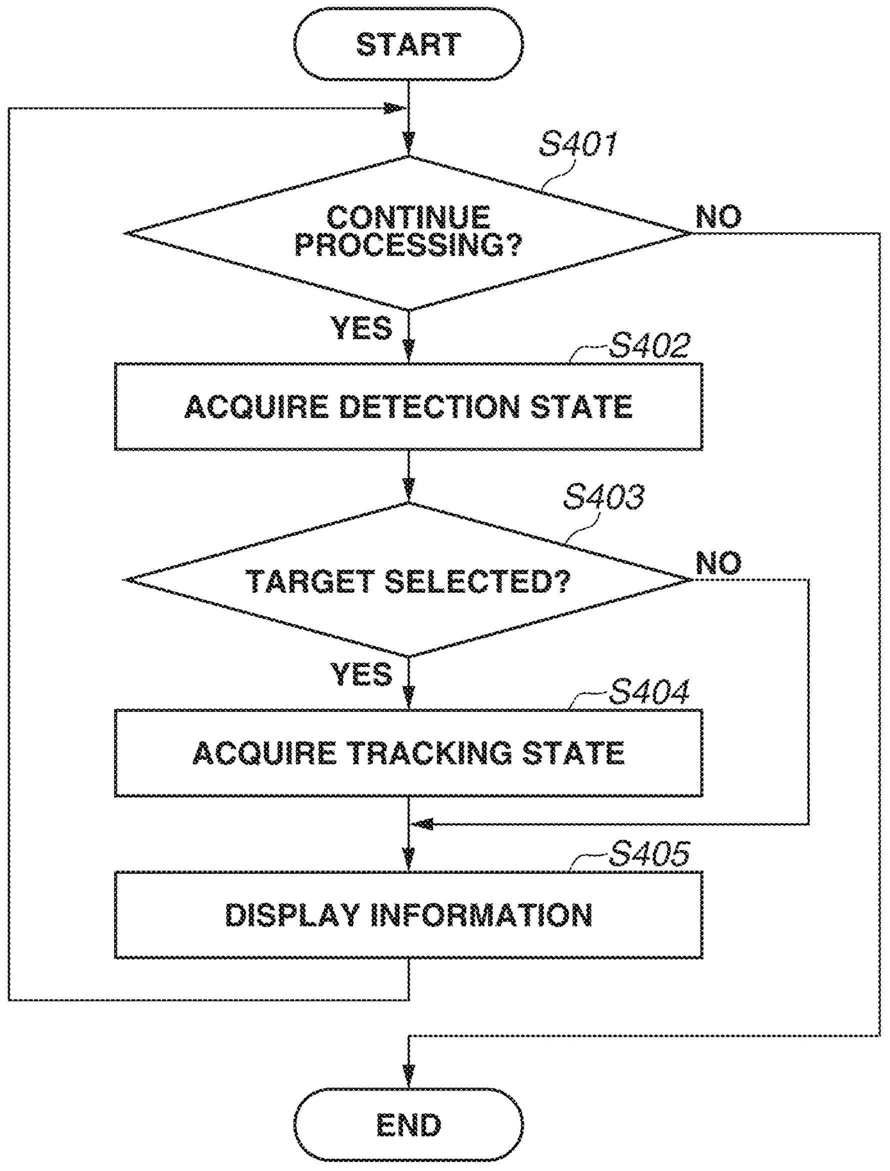
FIG. 4 is a flowchart illustrating an example of a basic operation of an information apparatus.

Processing for controlling the PTZ camera 100 based on the user's operations on the PC 200 illustrated in FIG. 4 will now be described. The PTZ camera 100 is controlled based on control commands transmitted from the PC 200. The operation of the PTZ camera 100 is the operation when the CPU 101 receives subject selection information in the control flow illustrated in steps S304 and S305 in FIG. 3. Thus, the description of the operation will be omitted. This control flow is started when the CPU 201 detects an operation for starting a menu screen displaying images captured by the PTZ camera 100 and information illustrated in FIG. 5A, via the user input I/F 206. When this control flow is started, the CPU 201 displays a menu screen 500, a tracking control state 501, a camera image 502 received from the PTZ camera 100 illustrated in FIG. 5A, on the display unit 205. The present embodiment will be described on the premise that no tracking target is selected, i.e., the tracking control has not yet been started.

In step S401, the CPU 201 of the PC 200 detects the user's operation for closing the menu screen via the user input I/F 206. It the user's operation is not detected (YES in step S401), the processing proceeds to step S402. If the user's operation is detected (NO in step S401), the processing exits the control flow.

In step S402, the CPU 201 of the PC 200 transmits a control command for acquiring information to the PTZ camera 100 via the network I/F 204. When the CPU 101 of the PTZ camera 100 detects the reception of the control command, the CPU 101 reads the subject information output in step S303 in FIG. 3 from the RAM 103 and then transmits the information to the PC 200 via the network I/F 105. The CPU 201 of the PC 200 calculates coordinates to superimpose the subject frames 503 to 505 on the camera image 502, based on the received subject information, and updates the menu screen on the RAM 203. Although the tracking control has not yet been started, the user can find out the subject information recognized by the PTZ camera 100. Then, the processing proceeds to step S403.

In step S403, the CPU 201 of the PC 200 detects whether the user is performing a subject selection operation, via the user input I/F 206. The user can input an operation by specifying one point on the camera image 502 through a mouse operation or touching on the camera image 502 displayed on the touch panel. However, the method for inputting operations is not limited thereto. As in step S304 in the above-described control flow in FIG. 3, if the user specifies the point 506, the CPU 201 converts the point 506 on the camera image 502 into coordinates in the camera's angle of view and transmits the coordinates to the PTZ camera 100. Then, the processing proceeds to step S404. If a tracking target (described below) exists, the processing constantly proceeds to step S404 regardless of the user's operation.

In step S404, the CPU 201 of the PC 200 acquires the tracking state from the PTZ camera 100. The tracking state refers to information about whether the ID read in step S305 in the above-described control flow in FIG. 3 is the tracking target (illustrated in FIG. 6B) transmitted from the PTZ camera 100. If the information is already provided in step S402, the CPU 101 can read the information from the RAM 103. When the CPU 201 checks the tracking target ID, the PTZ camera 100 changes the display of a tracking control state 511 to "Tracking". The display change can be made by changing the character string or by updating the color and pattern display. According to the present embodiment, the character string and the color are updated. The CPU 101 also shows the tracking target ID to the user by changing the display format of the subject frame corresponding to the tracking target ID. More specifically, the CPU 101 updates the subject frame 503 to the subject frame 513. Meanwhile, the CPU 101 does not update the subject frame 504 or 505 as indicated by the subject frames 514 and 515, respectively, and the CPU 101 shows the user a state where the CPU 101 has detected the subject but is not tracking the subject. The display format of frames is an example, and the method for changing the color and the pattern is not limited to the present embodiment. The CPU 201 updates the menu screen of the RAM 203 based on these pieces of information. Then, the processing proceeds to step S405.

Figure 5C:
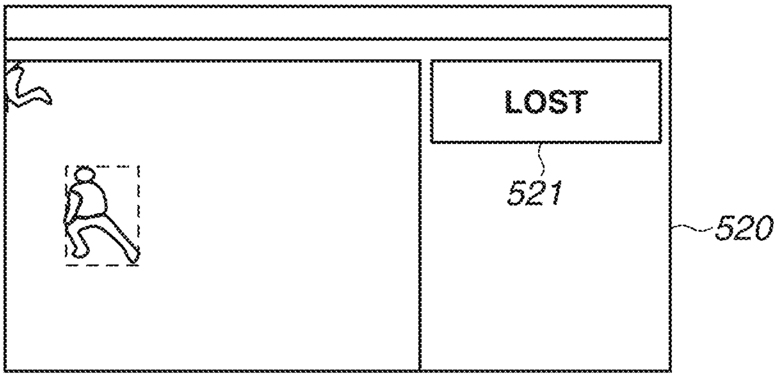

In step S405, the CPU 201 of the PC 200 displays the menu screen 510 updated on the RAM 203 by controlling the display unit 205. When this control flow is started, the screen illustrated in FIG. 5A appears. After the subject selection, the screen in FIG. 5A is changed to the screen illustrated in FIG. 5B. As illustrated in FIG. 5C, if the subject specified as the tracking target does not fit into the angle of view of the PTZ camera 100, information indicating that the positional information is lost, as illustrated in FIG. 6C, is transmitted from the PTZ camera 100. If the coordinates of the tracking target are not found out, for example, the CPU 101 changes the character string and the color display to indicate the lost state, as indicated by a tracking control state 521. This enables notifying the user of the lost state of the tracking target.

If the point specified by the user in step S403 has already been a tracking target subject, the CPU 101 can release the tracking target by selecting another subject to change the tracking target. Although the tracking operation is started through the subject selection, the user can change the setting to issue explicit instructions for starting and stopping the tracking operation.

The above-described basic operations enable an automatic tracking control of the PTZ camera 100 according to the user's subject selection in the control flow of the PTZ camera 100 and the PC 200.

Descriptions of Tracking Operation when a Plurality of Subjects is Selected

A tracking operation when a plurality of subjects is selected as a characteristic operation of the present invention will now be described. The operation of the PTZ camera 100 will be described about differences from the control flow illustrated in FIG. 3, and the operation of the PC 200 will be described about differences from the control flow illustrated in FIG. 4 with reference to FIGS. 7A to 9C.

Figure 7A:
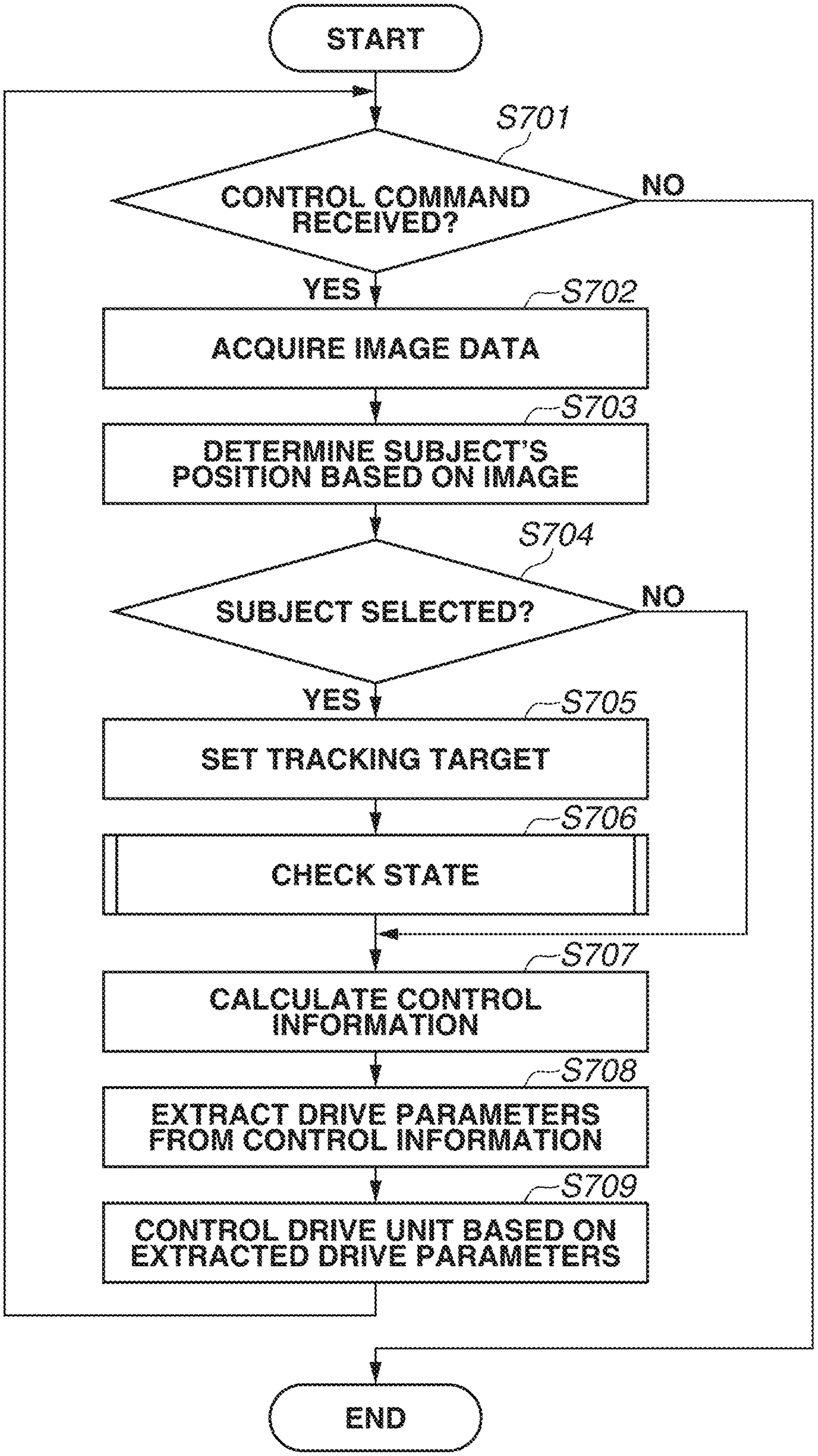
FIGS. 7A and 7B are flowcharts illustrating examples of control processing according to a first embodiment.
Figure 7B:
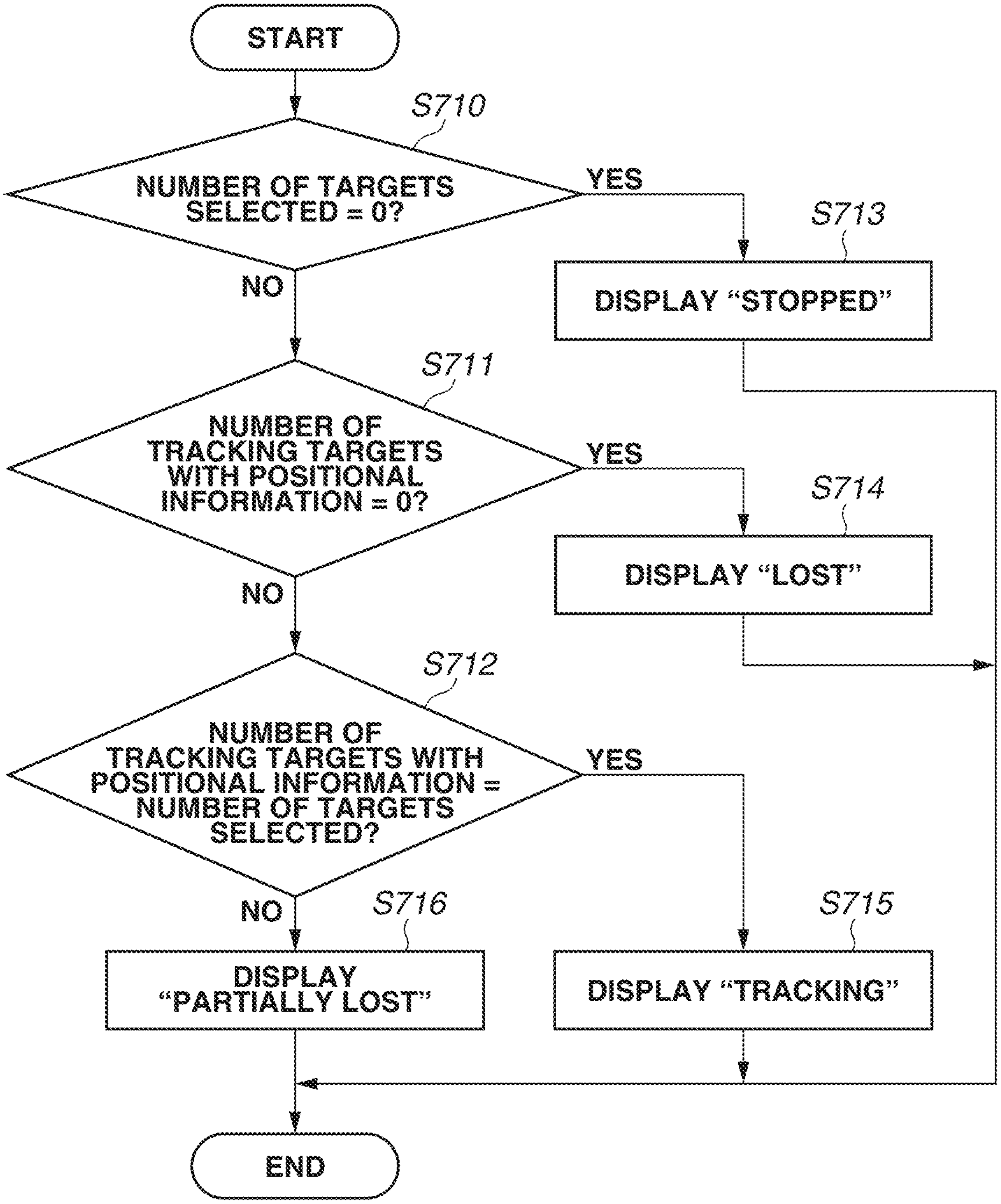

The control flow illustrated in FIG. 7A is started as in the control flow illustrated in FIG. 3. The operations in steps S701 to 703, 705, and 707 to 709 are performed as those in steps S301 to 303, 305, and 306 to 308, respectively.

In step S705, as in step S305, the CPU 101 transmits subject information for three different subjects from the PTZ camera 100. However, the PC 200 displays a menu screen illustrated in FIG. 8A instead of the screen in FIG. 5A. More specifically, the CPU 101 displays the number of targets selected 801 as the number of targets currently selected, the number of tracking targets 802, of which the positional information is acquired, and the number of detections 803 as the number of subjects currently detected. Since there are no selected subjects, the CPU 201 determines that the number of targets selected 801 and the number of tracking targets 802 are zero and the number of detections 803 is three, and updates the menu screen on the RAM 203.

In step S704, the CPU 101 of the PTZ camera 100 determines whether subject selection information is received as a control command from the PC 200, via the network I/F 105. As with the basic operation, if a point 804 is specified, the CPU 101 of the PTZ camera 100 transmits the information illustrated in FIG. 6B in step S705. In this case, the CPU 101 displays a state where a subject frame 813 is selected as a tracking target and at the same time updates the menu screen so that the number of targets selected 811 and the number of tracking targets 812 are 1.

In step S706, the CPU 101 of the PTZ camera 100 compares the tracking state received from the PTZ camera 100 with the number of targets selected. The processing in step S706 is equivalent to the control flow illustrated in FIG. 7B. The description will be given with reference to FIG. 7B on the premise that the processing proceeds to step S710. At this timing, as illustrated in FIG. 6B, the number of tracking targets corresponding to the acquired positional information is one, and the number of targets selected is also one. When the CPU 101 of the PTZ camera 100 completes the processing in step S706, the CPU 101 transmits the tracking control state to the PC 200 via the network I/F 105.

Figure 8A:
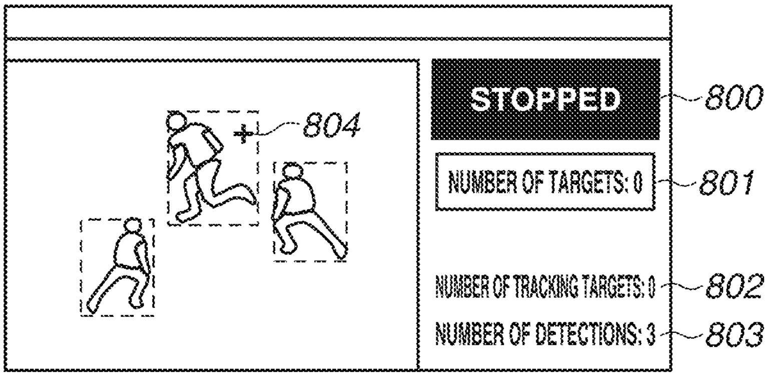
FIGS. 8A to 8F illustrate examples of information display according to the first embodiment.

In step S710, the CPU 101 determines whether the number of targets selected is zero. As described above, since the number of targets selected is one at this timing, the processing proceeds to step S711. The number of targets selected is zero when the control flow illustrated in FIG. 7A is started, and remains zero while no subjects are selected in step S704. In this case, the processing proceeds to step S713. In step S713, the CPU 101 transmits information so that a tracking control state 800 becomes "Stopped", as illustrated in FIG. 8A, and then updates the menu screen on the RAM 203.

In step S711, the CPU 101 determines whether the number of tracking targets is zero. Since the number of tracking targets is one at this timing, the processing proceeds to step S712. The advance of the processing to step S714 when the number of tracking targets becomes zero will be described below.

Figure 8B:
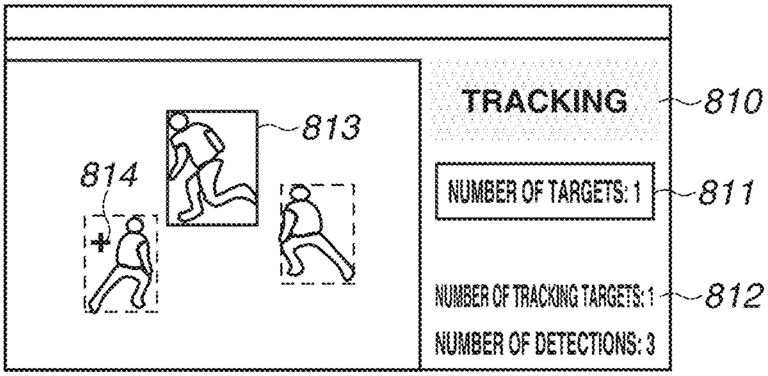
Figure 8C:
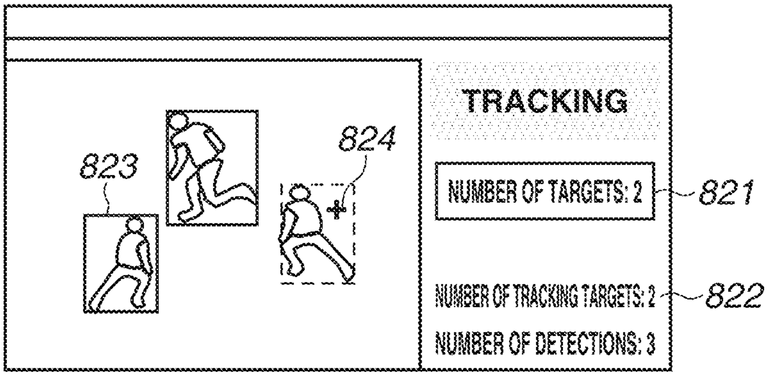
Figure 8D:
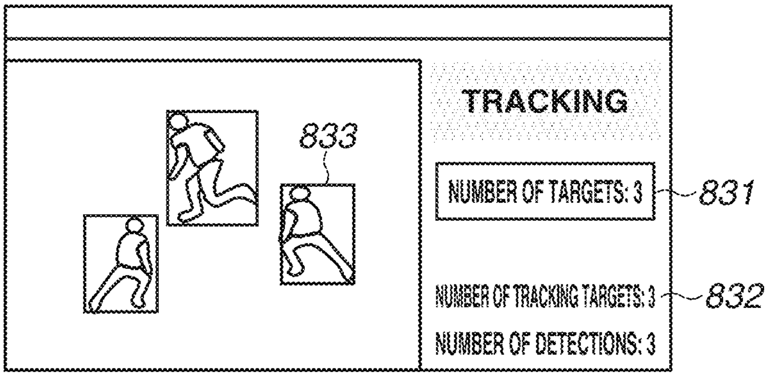

In step S712, the CPU 101 compares the number of tracking targets with the number of targets selected. If the number of targets selected matches the number of tracking targets (YES in step S712), the processing proceeds to step S715. If the number of targets selected does not match the number of tracking targets (NO in step S712), the processing proceeds to step S716. Since both the numbers are one at this timing, the processing proceeds to step S715. In step S715, the CPU 101 transmits information so that a tracking control state 810 becomes "Tracking". The CPU 201 of the PC 200 updates the menu screen on the RAM 203, as illustrated in FIG. 8B. Step S716 will be described below. After the completion of steps S713 to S716, the processing exits the control flow illustrated in FIG. 7B and proceeds to step S706 of the control flow illustrated in FIG. 7A.

On completion of the above-described operations, a menu screen illustrated in FIG. 8B appears. Then, when a point 814 is specified, the CPU 101 performs a similar control flow. As a result, the number of targets selected 821 and the number of tracking targets 822 become two, the display of a subject frame 823 is updated, and then a menu screen illustrated in FIG. 8C appears. When a point 824 is specified, the number of targets selected 831 and the number of tracking targets 832 become three, the display of a subject frame 833 is updated, and a menu screen illustrated in FIG. 8D appears. When the menu screen illustrated in FIG. 8D appears, the subject information transmitted by the PTZ camera 100 and received by the PC 200 is illustrated in FIG. 9A.

The PTZ camera 100 is to be controlled to track the subjects selected as tracking targets. Taking a state in FIG. 9A as an example, the method for calculating control positional information in step S306 is changed. While the coordinates of the center of gravity of the selected subject with one subject selected are calculated, the PTZ camera 100 can be turned to the center of the selected subjects obtained by calculating control positional information taking the center of gravity of the coordinates of the center of gravity of three subjects. For zooming, the calculation can be performed based on the ratio with the angle of view in consideration of the widths and heights of the frames of all subjects, in addition to the center of gravity. However, the calculation method is not limited thereto.

Assume a case where one of the subjects moves out of the angle of view of the PTZ camera 100.

Figure 8E:
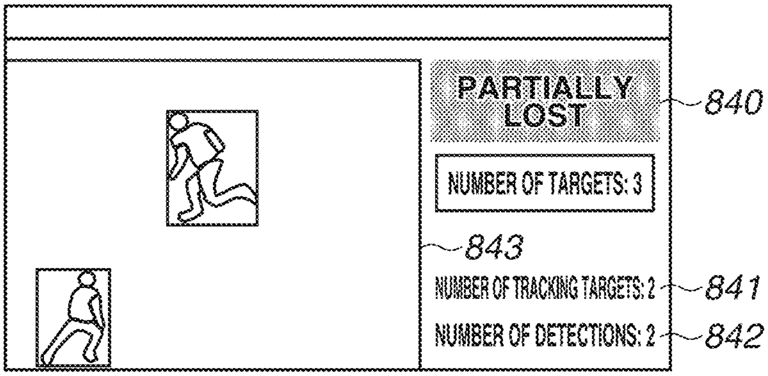

In a case of a camera image 843 illustrated in FIG. 8E, the subject information transmitted in step S705 is as illustrated in FIG. 9B. In this case, in step S712, the number of tracking targets with the positional information is two and the number of targets selected is three. Thus, the processing proceeds to step S716. In step S716, the CPU 101 transmits information so that "Partially Lost" is displayed, and updates the menu screen on the RAM 203. As illustrated in FIG. 8E, a tracking control state 840 is displayed as "Partially Lost", the number of tracking targets 841 and the number of detections 842 become two. The user can recognize that the number of targets specified cannot be tracked.

Figure 8F:
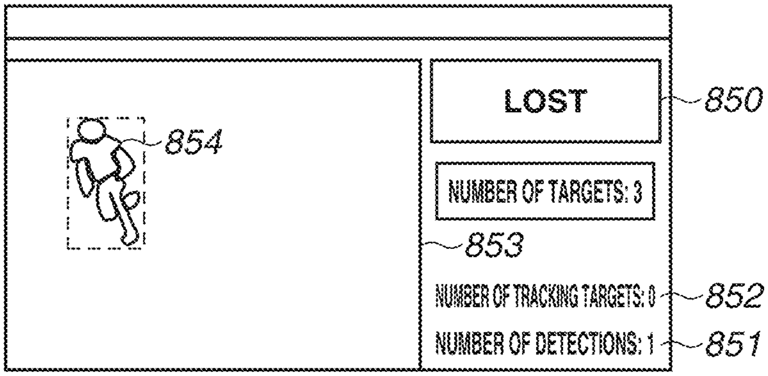

Further, assume a state where all of the subjects move out of the angle of view of the PTZ camera 100, and a subject 854 that was not tracked enters the angle of view thereof. In a case of a camera image 853 illustrated in FIG. 8F, the subject information is illustrated in FIG. 9C. At this timing, since the number of tracking targets with the positional information is zero (YES in step S711), the processing proceeds to step S714. In step S714, the CPU 101 transmits information to display "Lost" and updates the menu screen on the RAM 203. As illustrated in FIG. 8F, since a tracking control state 850 is displayed as "Lost", the number of tracking targets 852 is zero, and the number of detections 851 is one, the user can recognize that none of the targets corresponding to the number of targets specified is being tracked.

If the subject is not a tracking target, a frame equivalent to a "Stopped" frame as a detection result is displayed and thus the subject may be in a state where the subject cannot be detected depending on the posture or orientation, other than moving out of the angle of view. The user can explicitly specify coordinates or a subject that continues to be caught for a certain time period (a predetermined time period or a predetermined number of times of detection) in the angle of view can be automatically determined to be a tracking target and then can be in a selected state. If a subject is off the angle of view for a certain time period (a predetermined time period or a predetermined number of times of detection), the subject can be excluded from the tracking targets.

In the present embodiment, the example with the PTZ camera 100 has been described. However, the form of the present embodiment is not so limited thereto. The present embodiment is also applicable, for example, to an apparatus capable of detecting a plurality of subjects from an image and controlling the PTZ camera 100 based on the detection result. Specific examples of such apparatuses include an edge device and PC provided with an image input unit, network communication unit, and GPU.

According to the first embodiment described above, an imaging system for tracking a plurality of subjects can be driven in consideration of the increase and decrease in the number of tracking targets and show changes in tracking state to the user.

A second embodiment will be described. According to the first embodiment, a plurality of subjects is selected by a user successively selecting subjects. It, however, is conceivable that selecting predetermined subjects beforehand could save time and trouble of making successive selections. Thus, according to the present embodiment, how to show users in a method for managing a plurality of subjects will be described with reference to FIGS. 9A to 9C, FIG. 10, FIGS. 11A to 11D, FIGS. 12A to 12C, FIGS. 13A to 13D, and FIGS. 14A to 14D.

Figure 10:
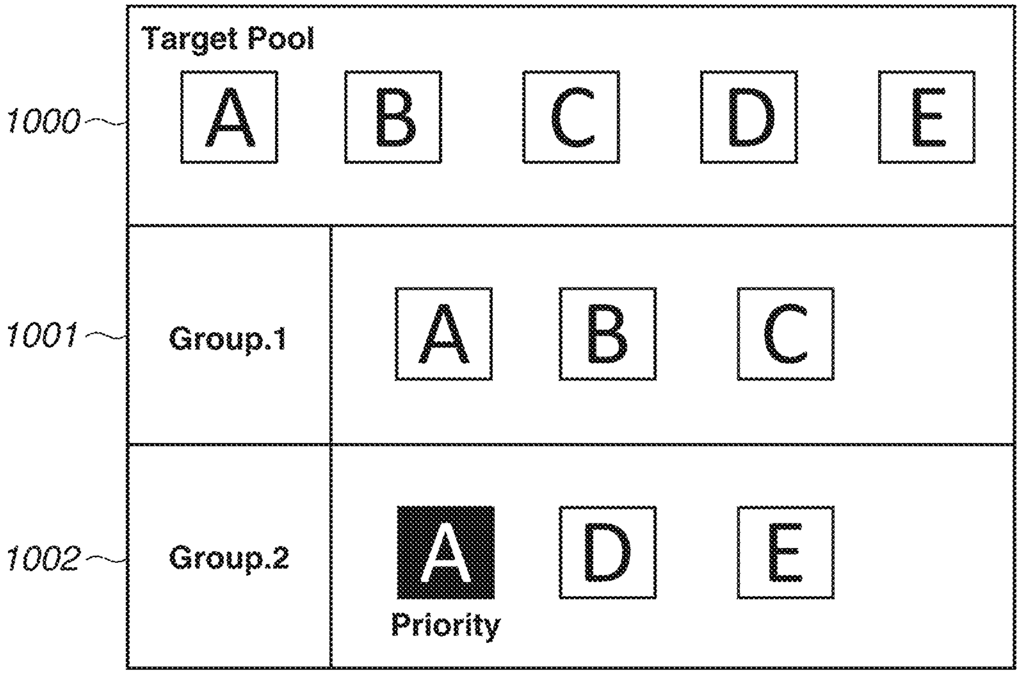
FIG. 10 illustrates an example of management of tracking targets according to a second embodiment.

FIG. 10 illustrates an example of subject management. A pool 1000 indicates a state where information based on features, such as faces, regarding subjects A to E previously registered by a user is being managed. In the method of the registration, the CPU 201 transmits via the network I/F 204 information input by the user using the display unit 205 and the user input I/F 206 of the PC 200 via a non-illustrated user interface (UI). The CPU 101 of the PTZ camera 100 receives the information via the network I/F 204 and stores the information in the ROM 102 or the RAM 103. The method is not limited thereto. Other methods can be implemented in the form of storing successively selected subjects each time as in the first embodiment or of transmitting separately generated information to the PTZ camera 100. The user has registered the subjects selected by the user out of the pool 1000 as a first group 1001 and a second group 1002.

The first group 1001 indicates a state where subjects A to C are selected, which is close to a selected state where the number of targets selected is three in the first embodiment.

Figure 11A:
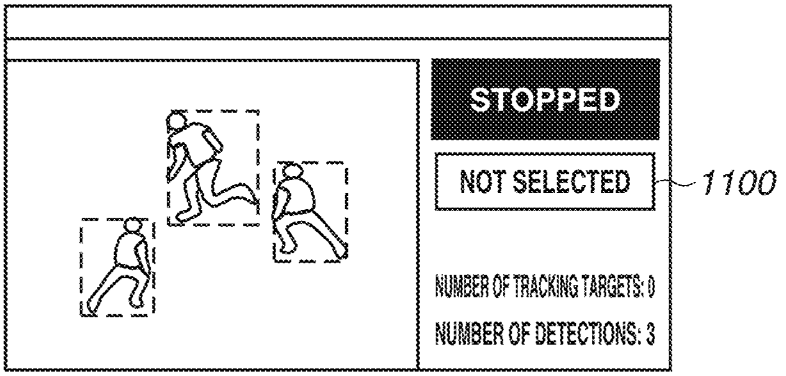
FIGS. 11A to 11D illustrate examples of information display according to the second embodiment.

In a similar system configuration to that of the first embodiment, modifications in the control flowcharts in FIGS. 3 and 4 will be described. As illustrated in FIG. 11A, three subjects are detected, and the number of targets selected 1100 is in the state of "Not Selected". In this case, the CPU 201 of the PC 200 displays not the targets selected in step S403 but the pool 1000, the first group 1001, and the second group 1002 illustrated in FIG. 10 via a illustrated UI on the display unit 205.

Figure 11B:
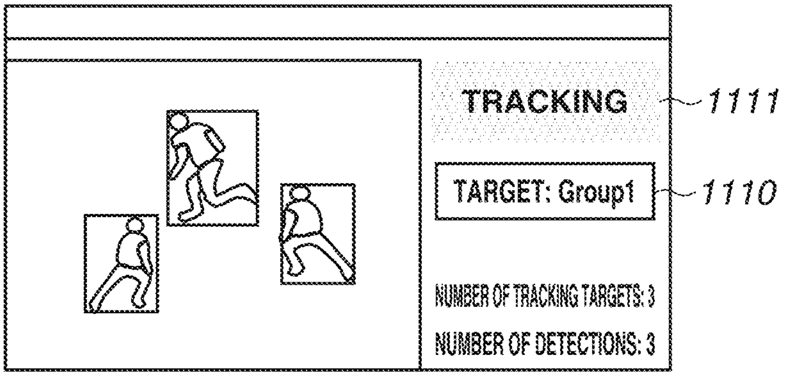
Figure 11C:
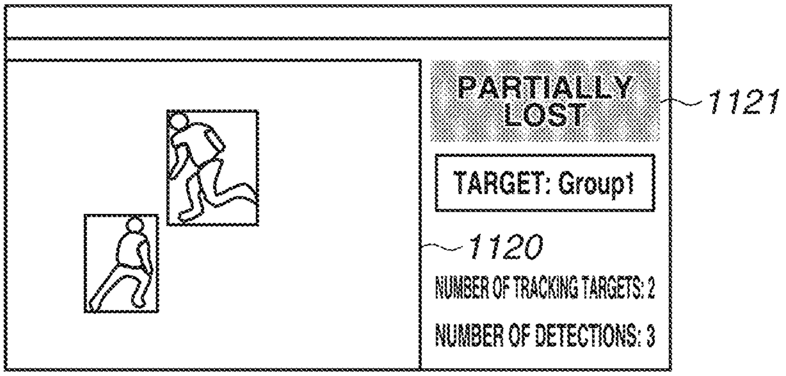

If the user selects the first group 1001 via the user input I/F 206, the CPU 201 displays a selection group 1110 in FIG. 11B and transmits the selection information to the PTZ camera 100. The CPU 101 of the PTZ camera 100 receives the subject selection information in step S304, not as the coordinates according to the first embodiment but as information about the selection of the first group 1001. In step S305, the CPU 101 searches the subject information for not the coordinates but targets which correspond to the subjects A to C associated with the first group 1001. According to the present embodiment, if the targets match the subjects A to C, an association with the subjects A to C is made in the subject information as illustrated in FIG. 12A.

Since the number of targets selected and the number of tracking targets are 3, then in step S705, the tracking control state is determined to be "Tracking" as indicated by a tracking control state 1111. Then, the CPU 201 of the PC 200 displays the menu screen in FIG. 11B. Assume a case where one of subjects is not detected in the angle of view of the PTZ camera 100, as in the first embodiment. In a case of a camera image 1120 illustrated in FIG. 11C, the subject information to be transmitted in step S705 is illustrated in FIG. 12B. In this case, since the number of tracking targets in the positional information is two and the number of targets selected is three (NO in step S712), the processing proceeds to step S716. In step S716, the CPU 201 transmits information so that "Partially Lost" is displayed as in a tracking control state 1121, and updates the menu screen on the RAM 203.

Figure 11D:
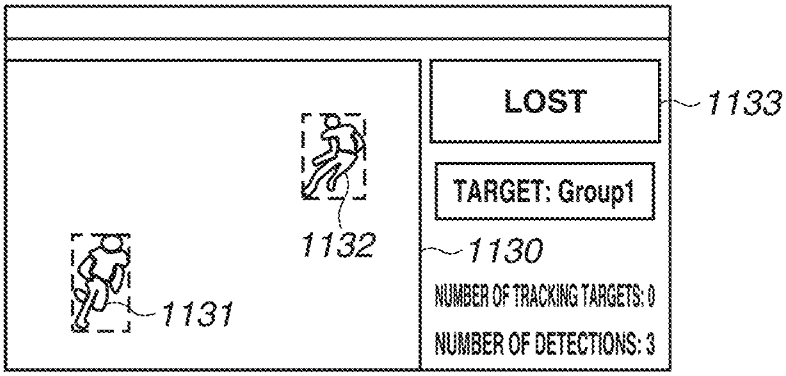

A case where a subject other than those in the groups appears will be described. Assume a case where a camera image 1130 illustrated in FIG. 11D is shown. A subject 1131 corresponding to the subject D and a subject 1132 not corresponding to the pool 1000 appear in the angle of view. The subject information is illustrated in FIG. 12C. In step S711, since the number of tracking targets is zero, the CPU 201 transmits information so that "Lost" is displayed in a tracking control state 1133 and updates the menu screen on the RAM 203. Group information can be set by the user storing the group information previously selected by the user in the ROM 102 and the CPU 101 reading the group information when the control flow is started, instead of the user making selections again.

Assume a case where the user selects the second group 1002 via the user input I/F 206. In the second group 1002, a priority setting is made for a selected subject, and the subject A is given higher priority than subjects D and E. A difference made by a priority-based tracking operation can be caused by changing the above-described center-of-gravity calculation in the calculation of control positional information in step S306.

Figure 13A:
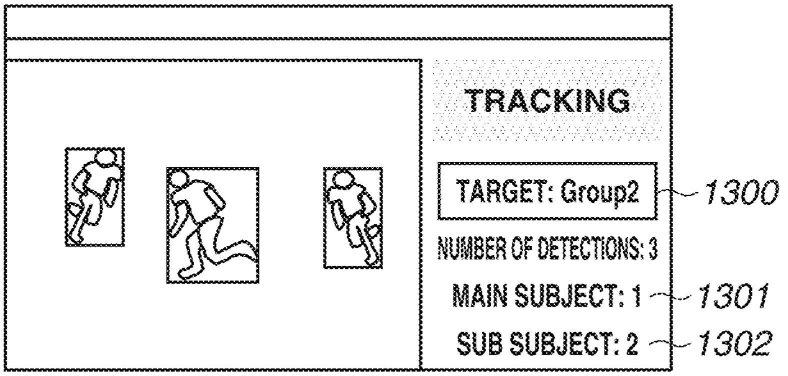
FIGS. 13A to 13D illustrate examples of information display in consideration of priority according to the second embodiment.
Figure 13B:
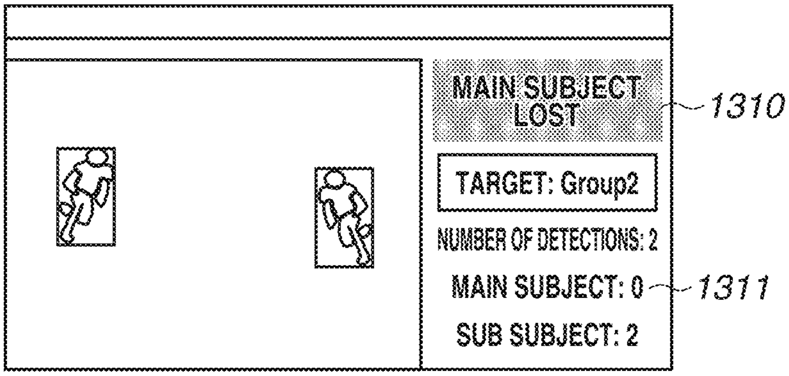
Figure 13C:
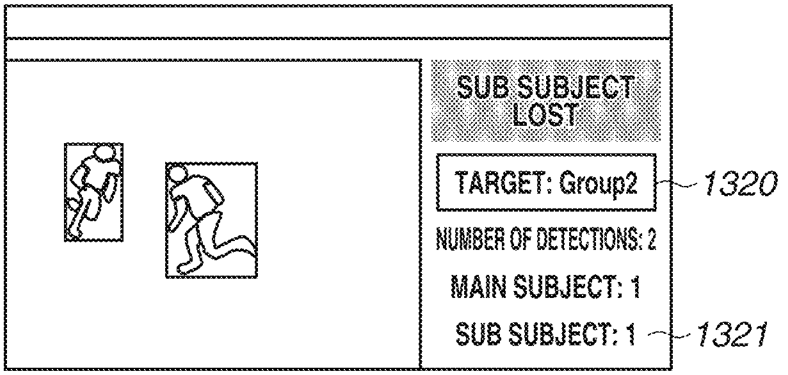
Figure 13D:
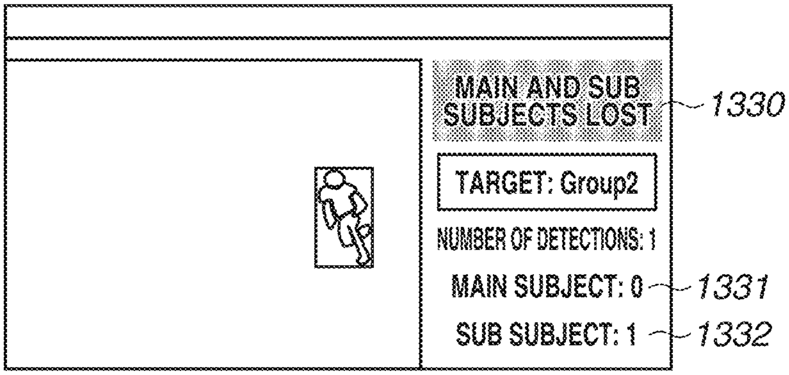

Assume a case where the second group 1002 is selected, and a menu screen illustrated in FIG. 13A is displayed. A selection target 1300 is changed to the second group, and subject information illustrated in FIG. 14A is communicated between the PTZ camera 100 and the PC 200. As indicated by the subject information illustrated in FIG. 14A, a type as the priority is added, a subject A is set as a main subject, and the subjects D and E are set as sub subjects. Using this information, the CPU 201 of the PC 200 updates the number of detections of main subjects 1301 to one and the number of detections of sub subjects 1302 to two.

A case where no subjects are detected in the angle of view will be described. In step S716 (described above), the CPU 101 displays the non-match between the number of tracking targets and the number of targets selected in the form of "Partially Lost". However, the addition of the priority results in a modification described below, allowing display of additional information to the user. Assume a case where the main subject A is not detected in the angle of view, i.e., subject information illustrated in FIG. 14B results.

In step S716, the menu screen being displayed becomes "Partially Lost". However, to emphasize that the main subject is not detected, the CPU 101 of the PTZ camera 100 resets a tracking control state 1310 as "Main Subject Lost". The CPU 101 updates the menu screen so that the number of detections of main subjects 1311 is zero. Likewise, with subject information illustrated in FIG. 14C, the sub subject E is not detected. Thus, the CPU 101 resets a tracking control state 1320 as "Sub Subject Lost" and updates the menu screen so that the number of detections of sub subjects 1321 is one, resulting in a display in FIG. 13C. With subject information illustrated in FIG. 14D, the main subject A and the sub subject D are not detected. Thus, the CPU 101 sets a tracking control state 1330 as "Main and Sub Subjects Lost" and updates the menu screen so that the number of detections of main subjects 1331 is zero, and the number of detections of sub subjects 1332 is one.

As in the case where the first group is selected, a detection of an unselected subject or a subject other than the groups results in "Lost".

Instead of explicit group selections by the user, a group selection can be made resulting from the CPU 201 determining that the result of subject detection corresponds to group information about any group. In this case, as priority when a plurality of groups matches the result of subject detection, controls can be performed, for example, of continuously setting the group found first or of setting a specific group given priority.

According to the second embodiment described above, a similar effect can be produced by showing users information indicating that the method for selecting a plurality of subjects and a subject type is changed from those according to the first embodiment.

A third embodiment will be described. According to the first and the second embodiments, a menu screen is updated to be shown to the user. As a method for determining the tracking control state more intuitively, the display of the lamp 112 mounted on the PTZ camera 100 can be changed to be shown to the user. FIG. 15 illustrates an example where tracking control states are replaced with different lighting patterns of the lamp 112. When determining and transmitting information indicating the tracking control state in step S706, the CPU 101 changes the display by controlling the lamp 112 accordingly. The CPU 101 can continue the same display until the control flow ends or the tracking control state is updated. In the present embodiment, as described above about the configuration of the PTZ camera 100, colors indicate the use of video images. Thus, an example will be described of changing patterns (lighting up and blinking). For "Stopped", the lamp 112 is turned off as the display of the tracking state is not required. For "Tracking", the lamp 112 is turned on as in ordinary imaging to show that tracking is normally being performed. "Lost", "Main Subject Lost", and "Main and Sub Subjects Lost" are not favorable as video images, and an intervention of interruption or manual operation is intermediately determined to be necessary, so that the lamp 112 is blinked at intervals of 0.5 seconds. "Partially Lost" and "Sub Subject Lost" is not as unfavorable as "Main and Sub Subjects Lost", and indicate that the problem occurs, so that the blinking of the lamp 112 is changed to intervals of one second. The display switching to distinguishing states is an example, but not limited thereto. The pattern can be changed by at least one of the blinking, the intensity, the color, and the number of light emitting diodes (LEDs) of the lamp 112.

In the third embodiment described above, a similar effect to that of the first and second embodiments can be produced in modified notification forms.

A fourth embodiment will be described. While, according to the first to the third embodiments, the PTZ camera 100 as an imaging apparatus performs subject detection and tracking control, the PC 200 as an information apparatus or a server as an external device can serve to perform subject detection and tracking. An example where the PC 200 serves to perform subject detection and tracking will be described below.

Figure 16:
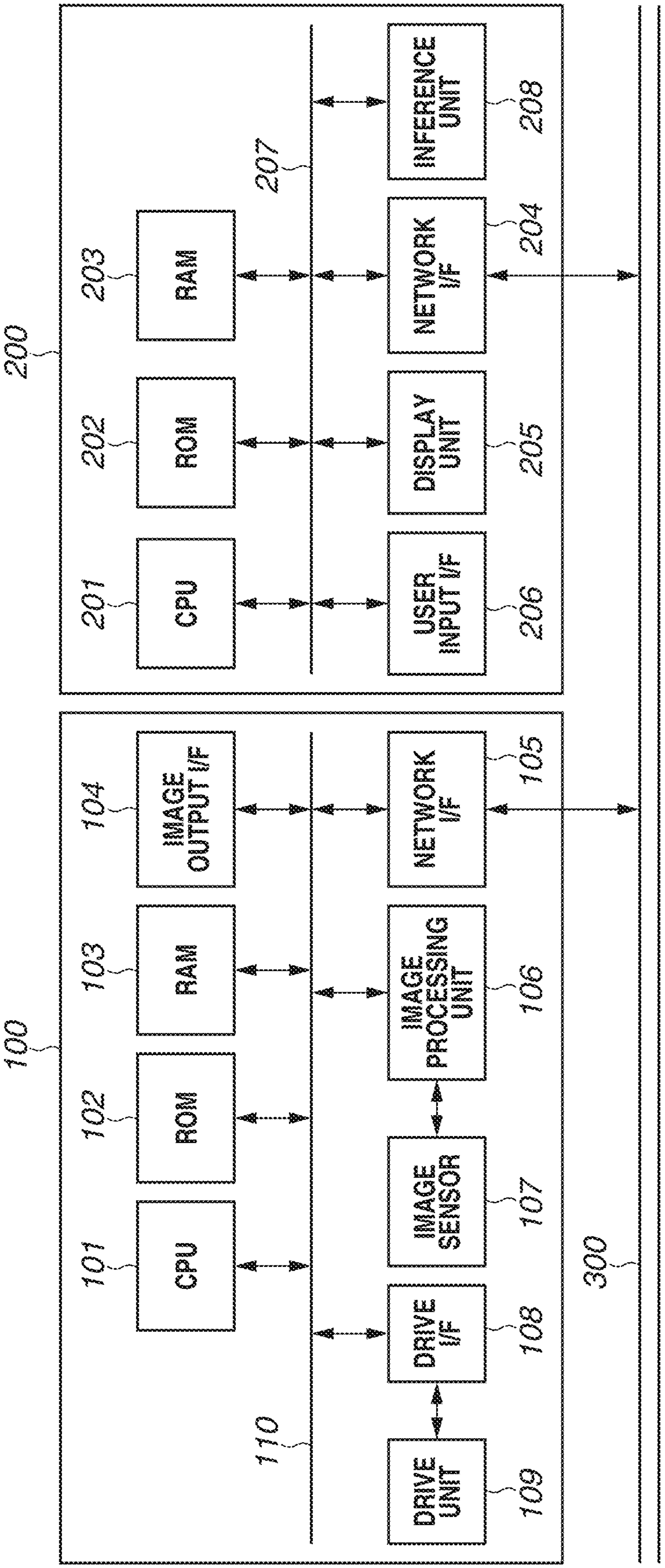
FIG. 16 illustrates examples of hardware configurations according to a fourth embodiment.

FIG. 16 illustrates a configuration of the present embodiment. The CPU 101, the ROM 102, the RAM 103, the image output I/F 104, the network I/F 105, the image processing unit 106, the image sensor 107, the drive I/F 108, the drive unit 109, and the internal bus 110 of the PTZ camera 100 are similar to those according to the other embodiments, and the inference unit 111 and the lamp 112 are removed. The CPU 201, the ROM 202, the RAM 203, the network I/F 204, the display unit 205, the user input I/F 206, and the internal bus 207 of the PC 200 are similar to those according to other embodiments, and an inference unit 208 is added. The operations of the inference units 111 and 208 are similar to each other. The PC 200 receives video images alone from the PTZ camera 100 and transmits pan and tilt control information, and the subject information is handled on the PC 200 alone.

Figure 17:
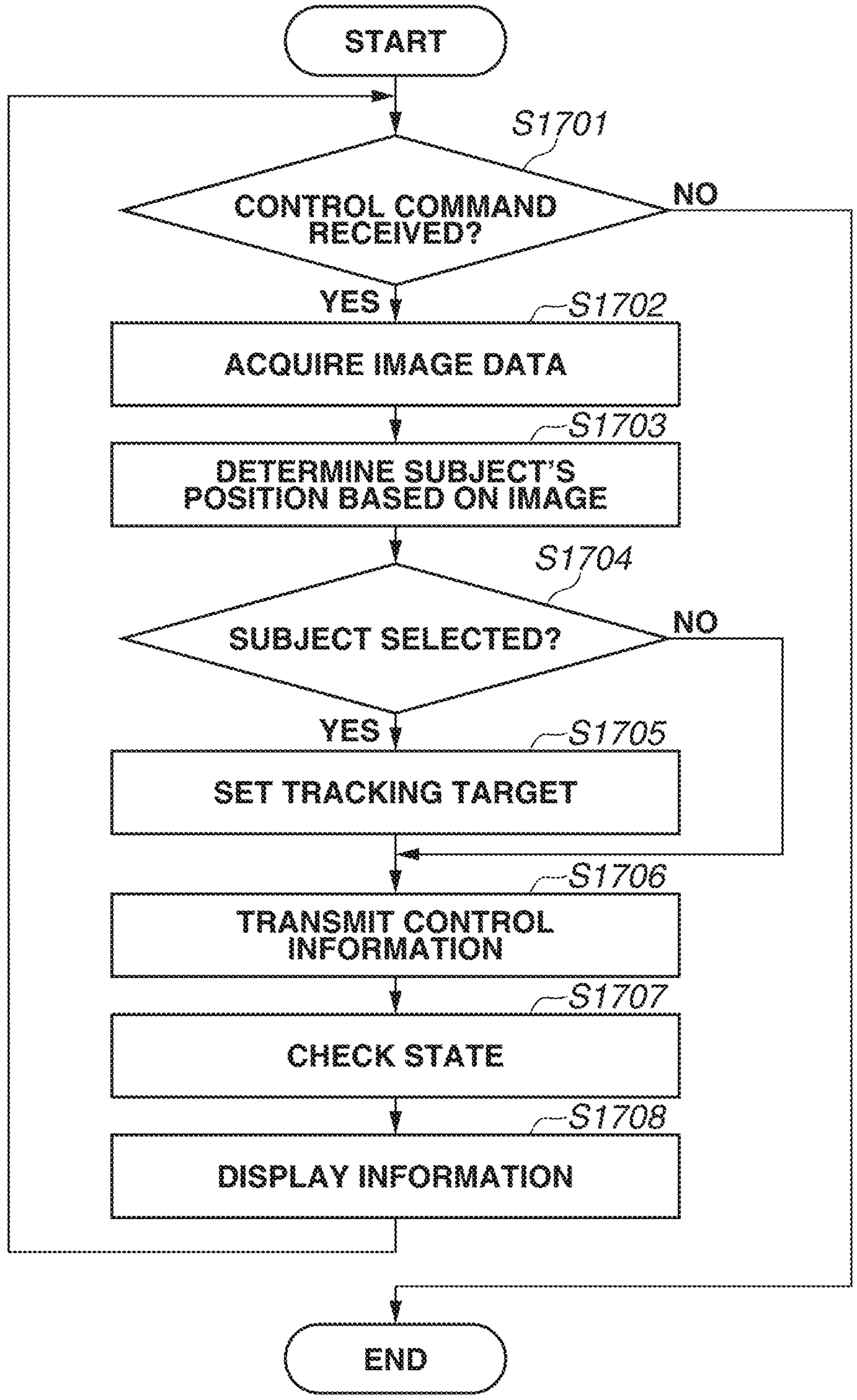
FIG. 17 is a flowchart illustrating an example of control processing according to the fourth embodiment.

FIG. 17 illustrates a control flow of the PC 200. This control flow is started when the CPU 201 of the PC 200 receives a control command for performing automatic tracking control via the network I/F 204 or the user input I/F 206.

In step S1701, the CPU 101 determines which is received via the network I/F 204, a control command or an end command and stores the received control command in the RAM 203. When the CPU 201 receives a control command (YES as the result of checking the operation state in step S1701), the CPU 101 stores the received control command in the RAM 203. Then, the processing proceeds to step S1702. When the CPU 101 receives an end command (NO as the result of checking the operation state in step S1701), the CPU 101 completes this control.

In step S1702, the CPU 101 receives a captured image of the PTZ camera 100 via the network I/F 204 and stores the image in the RAM 203.

In step S1703, as in step S303, the CPU 201 determines information about the features and positions of subjects from the captured image using the inference unit 208 and stores the information in the RAM 203.

In step S1704, as in step S304, the CPU 201 determines subject selection information. According to the present embodiment, as in the first embodiment, a menu screen can be displayed using the display unit 205 to detect the coordinates on the angle of view via the user input I/F 206. Besides, as in the second embodiment, group selection information can be received via the user input I/F 206. The subject information is stored in the RAM 203.

In step S1705, as in step S705, the CPU 201 determines a tracking target in the subject information and stores the subject information in the RAM 203 without transmitting the subject information to the outside.

In step S1706, as in step S306, the CPU 201 calculates control positional information. The calculated control positional information is transmitted via the network I/F 204 to the PTZ camera 100. The CPU 101 of the PTZ camera 100 performs the pan, tilt, and zoom operations via instructions from the PC 200 by performing the control in steps S307 to S308 based on the information.

In step S1707, as in step S706, the CPU 201 compares the tracking state with the selected target. As in the other embodiments, the CPU 101 determines the tracking control state based on the number of targets selected and the number of tracking targets and stores the tracking control state in the RAM 203.

In step S1707, as in the other embodiments, the CPU 201 displays the captured images, the subject information, and the tracking control state stored in steps described above, using the display unit 205.

According to the fourth embodiment, the PC 200 as an information apparatus can produce a similar effect to that of the other embodiments.

Other Embodiments

The present invention can also be implemented by a program for implementing at least one of the functions according to the above-described embodiments being supplied to a system or apparatus via a network or storage medium, and one or more processors in a computer of the system or apparatus reading and executing the program. Further, the present invention can also be implemented with a circuit, such as an Application Specific Integrated Circuit (ASIC) for implementing one or more functions. The present invention is not limited to the above-described embodiments but can be modified and changed in diverse ways without departing from the scope thereof.

The present invention enables an information processing apparatus for tracking a plurality of subjects to inform a user of tracking states.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc™ (BD)), a flash memory device, a memory card, and the like.

While the present invention has been described with reference to embodiments, it is to be understood that the invention is not limited to the disclosed embodiments, but is defined by the scope of the following claims.

This application claims the benefit of Japanese Patent Application No. 2023-220111, filed Dec. 26, 2023, which is hereby incorporated by reference herein in its entirety.

What is claimed is:

1. An information processing apparatus comprising:

a memory and at least one processor which function as:

a detection unit configured to detect a plurality of subjects from an image;

a tracking unit configured to track one or more subjects using information about the plurality of subjects detected by the detection unit;

a counting unit configured to count the number of subjects currently being tracked by the tracking unit; and a notification unit configured to notify a user of a tracking state by the tracking unit, wherein the notification unit notifies, as the tracking state, the number of subjects selected by the user and the number of subjects counted by the counting unit.

2. The information processing apparatus according to claim 1, wherein the notification unit is configured to change content of a notification between a case where the number of subjects selected by the user matches the number of subjects being tracked by the tracking unit and a case where the number of subjects selected by the user does not match the number of subjects being tracked by the tracking unit.

3. The information processing apparatus according to claim 1, further comprising a selection unit configured to select a subject as the tracking target.

4. The information processing apparatus according to claim 3, wherein the selection unit is configured to select the plurality of subjects detected by the detection unit in response to a plurality of subjects being continuously detected for a predetermined time period or a predetermined number of times.

5. The information processing apparatus according to claim 3, further comprising a subject management unit configured to identify and manage a subject, wherein a plurality of subjects selected by the selection unit from subject information stored by the subject management unit is compared with a subject detected by the detection unit, and when each of the plurality of subjects selected by the selection unit from the subject information stored by the subject management unit does not match the subject detected by the detection unit, a notification is issued by the notification unit.

6. The information processing apparatus according to claim 5, wherein the selection unit is configured to compare the subject information stored by the subject management unit with the subject detected by the detection unit, and when the subject information corresponds to the subject, the subject is selected as the tracking target.

7. The information processing apparatus according to claim 3, further comprising a subject management unit configured to preregister and manage subject information including a characteristic of the subject, wherein the selection unit is configured to select the tracking target based on the subject information registered with the subject management unit.

8. The information processing apparatus according to claim 3, wherein the notification unit is configured to distinguishably notify the user of a region of a subject detected by the detection unit and not selected by the selection unit and a region of a subject detected by the detection unit and selected by the selection unit.

9. The information processing apparatus according to claim 1, further comprising a subject management unit configured to preregister and manage subject information including a characteristic of the subject, wherein priority is set to a plurality of the subjects registered with the subject management unit.

10. The information processing apparatus according to claim 1, wherein the notification unit is configured to select a main subject as the tracking target and distinguishably notify the user of tracking states of the main subject and other subjects.

11. The information processing apparatus according to claim 1, wherein, in response to a user's instruction, the tracking unit is configured to delete the subject from the tracking targets.

12. The information processing apparatus according to claim 1, wherein the tracking unit is configured to delete the subject from the tracking targets.

13. The information processing apparatus according to claim 1, wherein the tracking unit is configured to change content of control, used for at least one of pan control, tilt control, and zoom control to track the subject, according to the number of subjects selected by the user.

14. The information processing apparatus according to claim 13, wherein the tracking unit is configured to use at least one of pan control, tilt control, and zoom control to track the subject.

15. The information processing apparatus according to claim 1, wherein the notification unit is configured to notify the tracking state by changing a lighting pattern of a tally lamp.

16. An information processing system comprising:

an imaging unit configured to capture an image and output the image;

a memory and at least one processor which function as: a detection unit configured to detect a plurality of subjects from the image;

a tracking unit configured to track one or more subjects using information about the plurality of subjects detected by the detection unit;

a counting unit configured to count the number of subjects being tracked by the tracking unit; and a notification unit configured to notify a user of a tracking state by the tracking unit, wherein the notification unit controls notification, as the tracking state, the number of subjects selected by the user as tracking targets and the number of subjects counted by the counting unit.

17. An information processing method comprising:

detecting a plurality of subjects from an image;

tracking one or more subjects using information about the plurality of subjects detected in the detection;

counting the number of subjects being tracked in the tracking; and notifying a user of a tracking state in the tracking, wherein the notification is controlled, as the tracking state, the number of subjects selected by the user as tracking targets and the number of subjects counted in the counting.

18. A non-transitory computer-readable storage medium storing a program to execute an information processing method according to claim 17.

19. The information processing method according to claim 17, further comprising selecting a subject as the tracking target.

20. The information processing method according to claim 19, wherein the plurality of subjects detected in response to a plurality of subjects being continuously detected for a predetermined time period or a predetermined number of times are selected.

21. The information processing method according to claim 19, further comprising preregistering and managing subject information including a characteristic of the subject, wherein the tracking target is selected based on the subject information registered.

22. The information processing method according to claim 17, wherein a main subject is selected as the tracking target and distinguishably notify the user of tracking states of the main subject and other subjects.

23. The information processing method according to claim 17, wherein, in response to a user's instruction, the tracking is configured to delete the subject from the tracking targets.

24. The information processing method according to claim 17, wherein the tracking is configured to change content of control, used for at least one of pan control, tilt control, and zoom control to track the subject, according to the number of subjects selected by the user.

25. The information processing method according to claim 24, wherein the tracking is configured to use at least one of pan control, tilt control, and zoom control to track the subject.

26. The information processing method according to claim 17, wherein the tracking state is notified by changing a lighting pattern of a tally lamp.

* * * * *